Aug. 11, 1942.  C. W. CLARKSON  2,293,014
OPTICAL SYSTEM FOR SPOTLIGHTS
Filed Sept. 25, 1941
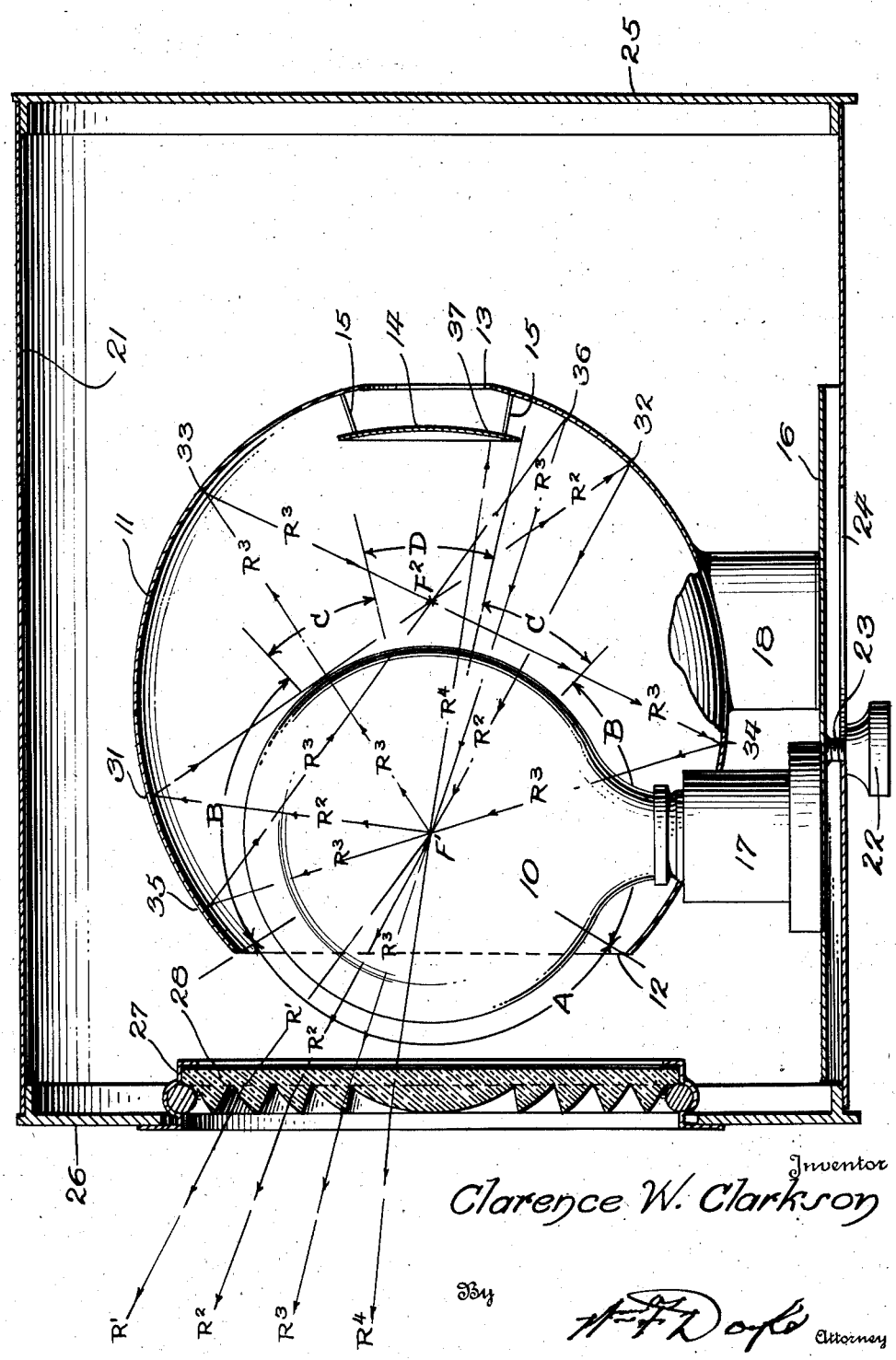
Inventor
Clarence W. Clarkson
By
[signature] Attorney Patented Aug. 11, 1942

2,293,014

UNITED STATES PATENT OFFICE 2,293,014

OPTICAL SYSTEM FOR SPOTLIGHTS

Clarence W. Clarkson, Washington, D. C.

Application September 25, 1941, Serial No. 412,226

2 Claims. (Cl. 240—41.3)

(Granted under the act of March 3, 1883, as amended April 30, 1928; 370 O. G. 757)

The invention described herein, if patented may be manufactured and used by or for the Government for governmental purposes without the payment of any royalty thereon.

The present invention relates to light projectors and particularly to a novel and improved optical system for spotlights.

In prior art devices of this character known to the inventor, it has been a custom to provide a light source and a condensing lens to intercept a portion of the light rays emitted from the source and focus them into a parallel beam.

In some instances, an intensifying mirror has been used, usually in the form of a spherical segment positioned immediately behind the light source with its center of curvature coincident with the center of the light source. The major portion of the light emitted from the source, however, is ordinarily not intercepted by either the lens or mirror and is absorbed as heat by the projector walls. It is obvious that the absorption of a large percentage of the rays emitted from the light source is highly disadvantageous in that it not only decreases the efficiency of the projector but also in that the generation of a large amount of heat from the absorption of the rays is objectionable.

It is, therefore, the primary object of this invention to provide a novel and improved optical system for spotlights whereby all of the rays emitted from a light source may be accurately focused in the same manner as rays directly impinging the lens, in order to utilize substantially all of the light rays emitted from the light source.

Another object of this invention is to provide a novel and improved optical system for spotlights whereby all of the rays emitted from a light source and not directly impinging the lens are redirected through one or more reflecting surfaces and thence through the exact center of the light source to permit them to be accurately focused.

A further object of the invention is to provide a light source positioned at one of the foci of an elliptical reflector having an aperture concentric with the axis of the ellipse whereby a portion of the rays from the light source are directly emitted through the aperture as a primary beam, and all rays not within the primary beam impinge the reflecting surface and are redirected through the light source again, to be then emitted as a part of the primary beam to intensify the beam.

The single figure of the drawing is a sectional view of a spotlight.

Referring now to the drawing accompanying and forming a part of this specification, the light source 10, illustrated as an incandescent lamp, is positioned so that the center of its filament lies at one of the foci $F^1$ of an elliptical reflector 11. The interior surface of the reflector 11 consists of a highly polished reflecting surface formed in a true elliptical shape about the foci $F^1$ and $F^2$. An aperture 12 is provided at the forward end of the reflector and is concentric with the axis of the foci $F^1$ and $F^2$, it being understood, of course, that the reflector 11 is circular in transverse cross-section so that all points of the reflector are concentric with a line through the foci $F^1$ and $F^2$ so that these points constitute primary and secondary focal points of the reflector. A ventilating aperture 13 is provided at the opposite end of the reflector 11, and a spherical reflector 14 is mounted on brackets 15 to intercept all rays of light falling in the rearmost area of the reflector. The reflector 14 is positioned with its center of curvature coincident with the focal point $F^1$ for reasons to be hereinafter pointed out.

The entire assembly of the light source 10 and reflector 11 are mounted on a base 16 by means of a socket 17 and bracket 18 and the base 16 is arranged for longitudinal sliding movement within the housing 21 by hand knob 22 threaded on a clamping screw 23 adapted to slide in a focusing slot 24 at the bottom of the housing. The casting 25 closes the rear of the housing, while a casting 26 which closes the front of the housing is provided with a flange 27 in which a condensing lens 28 is mounted.

The operation of the optical system of the device is as follows:

When the filament of the light source 10 is energized, light rays will be emitted in all directions from the point $F^1$ so that all rays falling in certain portions of the solid angle surrounding the light source will be intercepted by the reflector 11, but all rays included within the angle "A" will be emitted through the aperture 12. The major portion of these will directly impinge the condensing lens 28 to be focused into a beam, which we may designate as a simple or primary beam. The path of a typical ray of light of this beam is indicated in the drawing by the reference numerals $R^1$, which shows the ray directly emitted from the point $F^1$ passing outwardly through the condensing lens. The condensing lens 10 concentrates the numerous rays to form a substantially cone-shaped beam, but it will be understood, of course, that as the focusing knob 22 is moved rearwardly, the rays designated by the numeral $R^1$ will approach parallelism until, when the center of the light source 10 reaches the center of focus of the lens 28, all of the rays $R^1$ will be concentrated into a spotlight beam of substantially parallel rays.

All of the rays from the source $F^1$ which are emitted within the spherical angle "B" indicated in the drawing will impinge the interior surface of the elliptical reflector 11 and will be reflected twice, finally being redirected again through the point $F^1$ and outwardly through the aperture 12 to intensify the primary beam heretofore described. The path of a typical ray falling within this angle is illustrated in the drawing by the lines $R^2$, which show the ray first directed upwardly to impinge the reflector 11 at the point 31, thence directed downwardly through the focus $F^2$ to impinge the reflector again at the point 32 and thence be reflected again through the focal point $F^1$ and outwardly through the condensing lens 28. Inasmuch as the ray passes directly through the focal point $F^1$ immediately before impinging the lens, it possesses the same optical characteristics and may be focused in a manner identical with rays originally emitted from the light source. The rays emitted within the solid angle "B" will thus serve to intensify the primary beam and may be focused as a part of the primary beam.

All rays of light emitted from the source 10 within the spherical angle designated as "C" in the drawing will be reflected on the interior surfaces of the elliptical reflector 11 four times before being emitted from the aperture 12, but when so reflected will be directed through the focal point $F^1$, immediately before impinging the condensing lens 28 and will thus also intensify and form a part of the beams heretofore described. A typical path of one of the rays falling within the angle "C" is designated by the line $R^3$ wherein the ray impinges the reflector 11 at the point 33, passes through the focus $F^2$ to the point 34, thence through the focus $F^1$ to the point 35, thence through the focus $F^2$ to the point 36, and finally through the light source 10 on the focal point $F^1$ and outwardly through the condensing lens 28.

All rays of light emitted from the source 10 within the angle "D" will impinge the spherical reflector 14, and since this reflector has its center of curvature coincident with the focal point $F^1$, these rays will be reflected squarely backwardly through the focal point $F^1$ and thence through the condensing lens 28 to further intensify the beam. The path of a typical ray falling within this angle is illustrated in the drawing by the line $R^4$, wherein it will be seen that the ray emitted from the source 10 will first impinge the spherical reflector 14 at the point 37 and will be directed backwardly through the source 10 and through the condensing lens 28. It will be noted that the spherical reflector 14 bears a definite dimensional relationship with the aperture 12 of the elliptical reflector, since the angle about the second focus $F^2$ subtended by the reflector 14 is equal to and opposite of the angle intercepted by the aperture 12 with respect to the focal point $F^2$.

From the foregoing description, it will be obvious that practically all of the light rays emitted from the light source 10 may be utilized in the formation of a single beam of parallel rays, it being understood, of course, that although the device is illustrated in the drawings in its position when used as a floodlight to project a divergent cone-shaped beam, yet when the center of focus of the light source 10 and the focal point $F^1$ are moved to the center of focus of the condensing lens 28, all of the rays passing through the focus $F^1$ and impinging the condensing lens 28 will be focused into a cylindrical beam of parallel rays. Thus, by following the teachings of this invention, it is entirely practicable to utilize in a focusing spotlight projector a far larger percentage of the total light emitted from the source than has heretofore been regarded as practicable. Further, this may be accomplished without difficulties due to unwarranted dispersion of the rays, since each ray will be projected directly through the original center of the light source and thus each ray, no matter how often reflected, will have the same characteristics when it finally leaves the source of light as the rays originally emitted therefrom.

Having thus described my invention, what I claim as new and desire to secure by Letters Patent is:

1. In a light projector, in combination, an elliptical reflector having smooth polished interior light-reflecting surfaces and including a light-projecting aperture at the front end of said reflector and a ventilating aperture at the rear end of said reflector, both of said apertures being concentric with the axis of projection of the beam, the arrangement being such that the two foci of the elliptical reflector lie in substantial spaced relationship with each other on the said axis of projection, the projection aperture being positioned forwardly of both of said foci; a spherical reflecting surface at the rear end of the elliptical reflector and opposite from the projection aperture, said spherical reflector being of smaller diameter than the projection aperture and arranged to subtend a solid angle with respect to the rear focus of the elliptical reflector opposite and equal to the angle subtended by the projection aperture with respect to the rear focus; a light source located at the front focus of the elliptical reflector, a condensing lens positioned exterially of and in front of the projection aperture and spaced apart from said aperture, the lens being coaxial with the light source, the elliptical reflector and the spherical reflector; common mounting means to maintain the light source, spherical reflector and elliptical reflector in fixed relation positions with respect to each other, and adapted to simultaneously shift the light source, the spherical reflector and the elliptical reflector with respect to the condensing lens, to alter the optical characteristics of the projected light beam.

2. In a light projector, in combination, an elliptical reflector having smooth polished interior light-reflecting surfaces and including a light-projecting aperture at the front end of said reflector, said aperture being concentric with the axis of projection of the beam, the arrangement being such that the two foci of the elliptical reflector lie in substantial spaced relationship with each other on the said axis of projection; a spherical reflecting surface at the rear end of the elliptical reflector and opposite from the projection aperture, said spherical reflector having its center of curvature coincident with the front focus of the elliptical reflector and being of smaller diameter than the projection aperture; a light source located at the front focus of the elliptical reflector; a condensing lens; and common mounting means to maintain the light source, spherical reflector and elliptical reflector in fixed relative positions with respect to each other, and adapted to simultaneously shift the light source, the spherical reflector and the elliptical reflector with respect to the condensing lens, to alter the optical characteristics of the projected light beam.

CLARENCE W. CLARKSON.